ELECTRONIC ACTUATOR FOR AN ENGINE PROTECTIVE SYSTEM
Original Filed Oct. 11. 1966 2 Sheets-Sheet 1
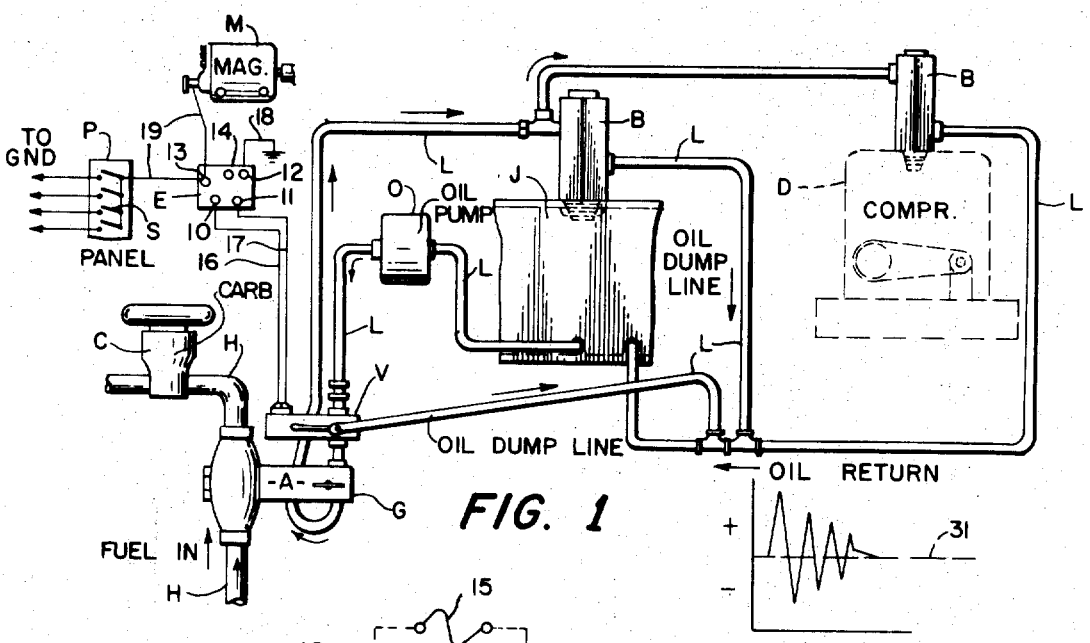
FIG. 1
FIG. 5
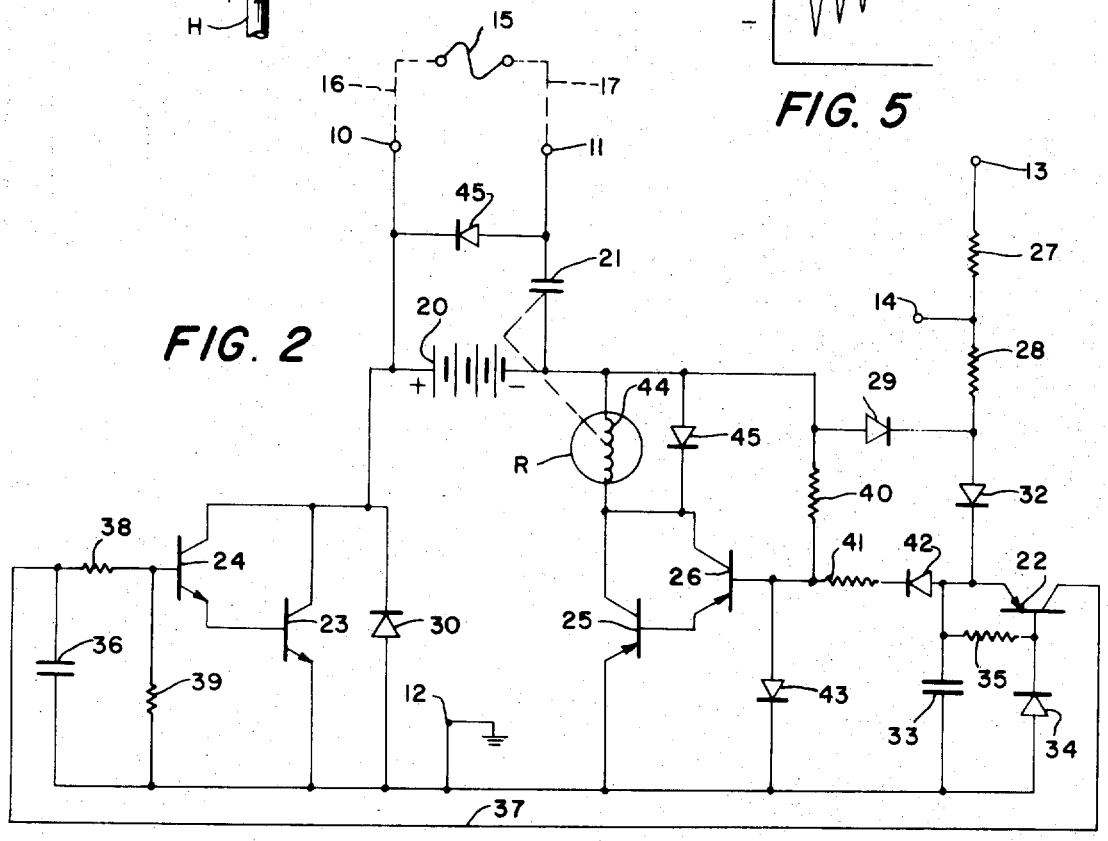
FIG. 2
INVENTORS
JOE E. GOODWIN
RALPH B. JOHNSON, JR.
Cameron, Kerkam & Sutton
ATTORNEYS

ELECTRONIC ACTUATOR FOR AN ENGINE PROTECTIVE SYSTEM

Original Filed Oct. 11. 1966 2 Sheets-Sheet 2

INVENTORS
JOE E. GOODWIN
RALPH B. JOHNSON, JR.

Cameron, Kerkam & Sutton
ATTORNEYS

United States Patent Office

Re. 27,108
Reissued Mar. 30, 1971

27,108
ELECTRONIC ACTUATOR FOR AN ENGINE PROTECTIVE SYSTEM

Ralph B. Johnson, Jr., and Joe E. Goodwin, Denver, Colo., assignors to Sentinel Distributors, Inc., Denver, Colo.

Original No. 3,385,278, dated May 28, 1968, Ser. No. 585,798, Oct. 11, 1966. Application for reissue Nov. 12, 1969, Ser. No. 875,644
Int. Cl. F02b *77/00;* F01p *5/14*
U.S. Cl. 123—198 15 Claims

Matter enclosed in heavy brackets [ ] appears in the original patent but forms no part of this reissue specification; matter printed in italics indicates the additions made by reissue.

ABSTRACT OF THE DISCLOSURE

The flow of fuel to an internal combustion engine is controlled to provide a safety shut down of the engine in response to a malfunction of the engine or an accessory device driven by the engine. A solenoid operated valve is connected in the fuel supply system and has its operating coil adapted to be energized by an electronic sensing circuit which monitors operation of the engine or the accessory device.

The present invention relates to engine protective systems and more particularly to an electronic actuator adapted for use in engine protective systems of the type shown and described in U.S. Pat. 3,202,143.

In U.S. Pat. 3,202,143, there are disclosed pressure and temperature responsive engine shut-down devices adapted for automatically shutting down internal combustion engines in response to abnormal pressure or temperature conditions by cutting off the supply of fuel to the engine. This automatic cut-off is effected whenever the pressure of the oil lubricating either the engine or a machine driven by the engine falls below a predetermined level or whenever the coolant temperature exceeds a preset-maximum.

In many installations, engines are unitized to a compressor and there are provided a number of normally open safety switches and associated indicators which are connected to ground the engine magneto when a malfunction occurs and provide a visual indication of the malfunction. The switches are conveniently mounted to a tattle-tale panel through which the ground connection is made. Commercially available panels may contain any number of safety switches, and panels accommodating up to 22 switches are common. Although such systems provide an effective means of providing visual indication of a malfunction, hence the name of tattle-tale, and grounding the engine magneto, they do not close off the fuel supply to a gas engine, which is still the most desirable way of securing operation in case of an emergency.

The present invention is an improvement over the afore-mentioned U.S. patent in that the fuel supply to the engine is adapted to be cut off when any malfunction occurs and any existing safety switch of a tattle-tale panel operates to ground the engine magneto.

The versatility of such a system affords several advantages. By cutting off the supply of fuel to the engine as a result of any malfunction of the engine or associated driven equipment, post ignition or dieseling caused by carbon deposits in the engine head, which continue to glow after the magneto is grounded, is prevented. Also the compressors or other driven equipment are precluded from restarting the engine and the explosion hazard is reduced. Gas leaks to the carburetor when the engine is not running are prevented and damage to the valves and other engine parts due to sour gas are minimized.

The principal object of the present invention is to provide a rugged, low cost trouble-free electronic actuator capable of effectively protecting an engine or an engine-driven accessory against damage upon the occurrence of a malfunction in the system.

Another object of the present invention is to provide an electronic actuator adapted to cut off automatically the supply of fuel to an engine whenever the engine magneto is grounded.

A further object of the invention is to provide a safety shut-down system which is capable of reacting positively to excessive water jacket temperature and oil pressure failure or grounding of the magneto to cut off the supply of fuel to an engine.

Another object of the present invention is to provide a novel actuating circuit responsive to the output of an engine driven magneto for controlling operation of the engine.

A further object of the present invention is to provide a novel pulse sensitive circuit for actuating a load device.

Still another object of the present invention is to provide a novel r.p.m. sensitive circuit for actuating a load device.

Another object of the present invention is to provide a novel r.p.m. sensitive circuit for providing a simple and reliable indication of the r.p.m.'s of a driven element.

A further object of the present invention is to provide a novel battery operated actuating circuit including means for maintaining the battery constantly charged.

These and other objects of the invention, including the provision of a safety shut-down system of the character described which can be quickly and easily installed on any engine or engine-driven unit such as a transmission, torque converter, compressor or the like, and which will operate reliably after initial installation without adjustment, maintenance or repair over long periods of time, will appear more fully upon consideration of the detailed disclosure which follows.

To this end, in accordance with one feature of the present invention, there is provided a solid state electronic actuator which is responsive to the output of an engine magneto and adapted to actuate a solenoid dump valve upon grounding of the magneto. The solenoid valve is connected in the oil lubricating system and controls actuation of an independently operable oil pressure fuel cut-off valve which effects cut-off of the supply of fuel to the engine to provide a fast, positive engine shut-down.

In accordance with another feature of the invention, the electronic actuator is adapted to be pulse or r.p.m. responsive to effect cut-off of the fuel supply whenever the engine falls below a set r.p.m. level or exceeds a set r.p.m. level.

In accordance with another feature of the invention there is provided a trickle charging circuit adapted to maintain the operating battery fully charged from the input pulses to the electronic actuator.

Although certain specific embodiments of the invention are described and illustrated in the accompanying drawings, it is to be especially understood that these drawings are for the purpose of illustration only and are not intended to be construed as defining the limits of the invention, for which latter purpose reference should be had to the appended claims.

In the drawings, wherein like reference characters indicate like parts throughout the several views:

FIG. 1 is a fragmentary, diagrammatic view of the present invention wherein an internal combustion engine using vapor gas, i.e., natural vapor gas or butane-propane, is fitted with both oil pressure responsive and coolant temperature responsive engine shut-down devices and a solenoid valve adapted to be actuated by an elecronic actuator in accordance with the present invention;

FIG. 2 is a schematic diagram of the electronic actuator of the present invention which is pulse time sensitive to the engine magneto output;

FIG. 5 is a graphical representation of a typical magneto output pulse.

Figure 4:
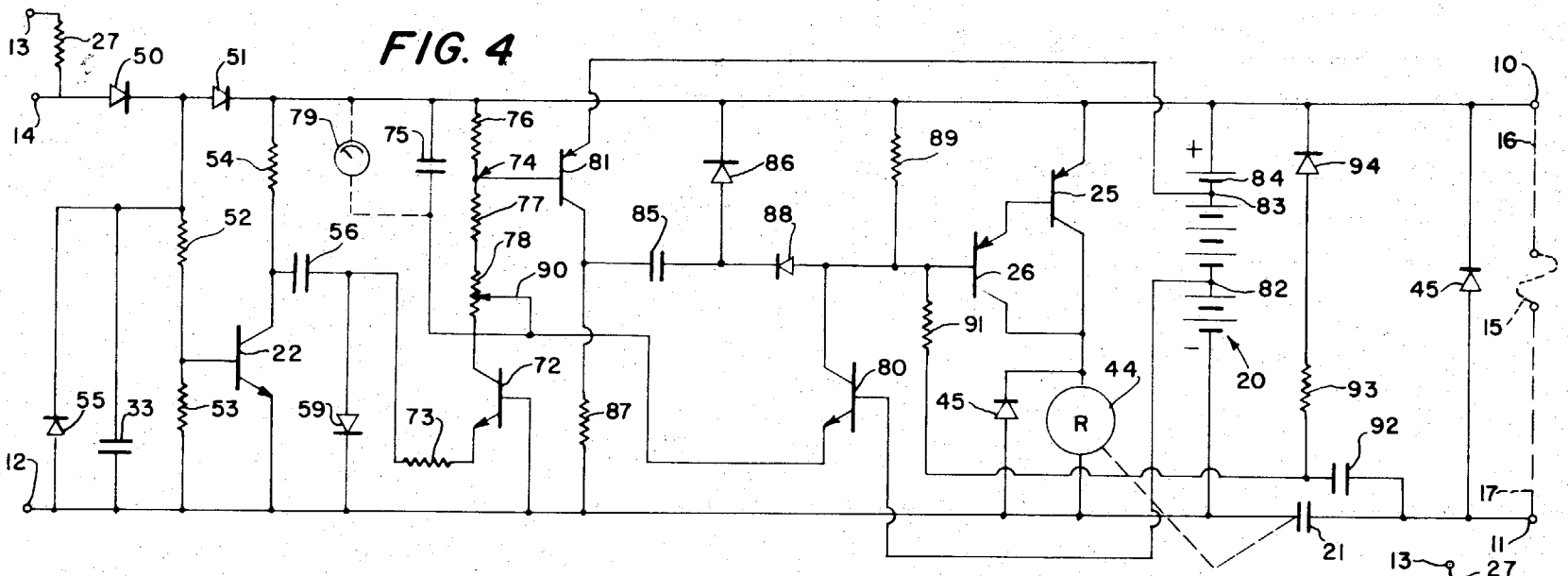
FIG. 4 is a schematic diagram of the electronic actuator of the present invention provided with a built in engine overspeed control.

Referring now to FIG. 1 the physical details of well known components of the engine protective system, including the engine and accessory driven equipment, have been omitted for clarity; however, it should be apparent that the system comprises the usual carburetor C, oil pump O and cooling jacket J. An oil pressure control engine shutdown device or valve A and a coolant temperature control shutdown device or valve B are provided in combination with the typical internal combustion engine or prime mover.

The detailed construction of valves A and B are fully disclosed in the aforementioned U.S. Pat. 3,202,143, to which reference may be made. Accordingly, the details of valves A and B will not be herein described. However, it should be noted that when installing the devices on a vapor gas engine, it is preferable that valve A be connected to the intake side of the fuel pump and mandatory that it be so connected to the pressure side of the oil pump O. Valve B is simply threaded into a tapped hole in the jacket J and connected by suitable hose lines L to the oil outlet fitting of valve A and a non-pressure oil return opening in the engine block.

For convenience, the safety valves A and B will be referred to hereinafter as the Oil Sentinel and Heat Sentinel, respectively. Heat Sentinel B, which is threaded into the cooling jacket J of the engine, as indicated in FIG. 1, may be operable by a fusion type thermal sensing element (not shown) responsive to temperature variations of the coolant medium in said jacket, and is adapted to cause a drop in the oil pressure to which Oil Sentinel A is subject, sufficient to effect closing of the fuel valve whenever the temperature of the coolant exceeds a predetermined value.

Oil Sentinel A is connected to the forced feed lubricating system of the engine with which it is associated; however, it is also adapted for connection to the lubricating system of an engine driven accessory, such as, for example, a compressor D illustrated by dashed lines in FIG. 1. The oil pressure responsive Oil Sentinel A includes an internal fuel valve (not shown) connected in the fuel line H of the engine adapted to be closed to cut off the supply of fuel to the engine. It should be apparent that the fuel valve is maintained in an open position permitting a free flow of fuel from the inlet side, through the valve to the carburetor, as long as the oil pressure in the lubricating system of the engine (or associated driven accessory equipment) is maintained at or above the predetermined valve established for operation of the oil pressure responsive Oil Sentinel A.

As described in U.S. Pat. 3,202,143, Oil Sentinel A may also have its fuel valve partially opened by a manual control G when the operating oil pressure is insufficient to actuate the fuel valve to its full open position. Such manually operable means are particularly useful when the engine is unitized to a compressor, because it is frequently desirable to run the engine with the compressor disengaged, under which conditions the oil pressure in the lubricating system of the compressor would not hold the fuel valve in its open condition and the supply of fuel to the engine would be cut off.

Thus far, there has been described an engine safety shut-down system of the type disclosed in the aforementioned U.S. Pat. 3,202,143, the details of which are incorporated herein by reference. In accordance with the present invention, there is incorporated on the inlet side of the Oil Sentinel A, a solenoid valve V adapted to be actuated in response to the output of the engine magneto M to cause a drop in oil pressure to which Oil Sentinel A is subject, sufficient to effect closing of the fuel valve upon any malfunction of the engine or associated driven equipment.

The present invention is particularly adapted for operation in a system wherein the engine is unitized to a compressor and there is provided one or more normally open safety switches S mounted to a tattle-tale panel P and adapted to be actuated to ground the magneto M upon the occurrence of a malfunction. The output of the engine magneto M is connected to an electronic actuator E arranged to energize the operating coil of the solenoid valve V.

Advantageously, actuator E comprises a battery operated solid state circuit which may be completely potted, if desired, to withstand the rigors of vibration and adverse environmental conditions and which may be suitably mounted at any location. To this end, there is provided a novel battery charging trickle circuit which maintains the battery in a charged condition from the output of the engine magneto so as to avoid the necessity of frequent battery replacement.

Electrical connections to the actuator are made through a plurality of external terminals 10–14. Terminals 10 and 11 serve to connect the solenoid operating coil 15 to the actuator circuit through a pair of conductors 16 and 17. Terminal 12 provides a ground connection to the engine through conductor 18 and terminal 13 provides the connection to the magneto output through conductor 19 and is also connected to the ungrounded side of the normally open tattle-tale switches S. A fifth terminal 14 is provided where it is desired to obtain fuel shut-off without magneto grounding. In such an arrangement, terminal 13 is connected directly to the magneto output and terminal 14 is separately connected to one or more safety switches adapted to be actuated to their closed position upon the occurrence of a malfunction in the system.

Referring now to FIG. 2 there is shown schematically an electronic actuator which is adapted to be incorporated into the protective safety shut-down system of FIG. 1 and which functions in response to the output of the engine magneto M to control energization of the operating coil 15 of solenoid valve V which may be any suitable 3-way, normally open solenoid valve such as, for example, the commercially available Humphrey model 250 E–3. Operating coil 15 is electrically connected across a small battery pack 20 through terminals 10 and 11; however, operating voltage to the coil is not applied until closure of a pair of normally open relay contacts 21 connected in series with the coil. A diode 45 electrically connected across the operating coil 15 may be provided to prevent excessive voltage kick-back.

Battery pack 20 also provides the necessary bias voltage for operation of the actuator which comprises a sensor unit including a sequence or switching transistor 22, timing transistors 23 and 24 and set transistors 25 and 26 forming a "teeter-totter" circuit adapted to be set, cycled and returned to its OFF state. In addition, the actuator include[s] *circuitry components that permit the battery to be charged* [a battery trickle charging circuit to supply a trickle charge to the battery 20] from the output of the *engine* magneto. The trickle charge current is applied to [positive] *negative* terminal of battery 20 from terminal 13 through series connected resistors 27, 28 and diode 29 *during the negative swing of the magneto output* (*FIG. 5*). The return path for the trickle charge current from the [negative] *positive* terminal of battery 20 to ground is through collector-emitter junctions of timing transistors 23 and 24 when the circuit is in the SET state and through diode 30 connected across the collector-emitter junction of transistor 23.

As shown in FIG. 5, the output of the magneto M applied to terminal 13 is a damped oscillation, the pulses of which have negative and positive excursions below and above a reference point indicated by horizontal dashed line 31. Thus, in operation, only the negative pulses of the engine magneto are passed through diode 29 which has its anode connected to the positive terminal of battery 20 and its cathode connected to the lower end, as viewed in the drawing, of resistor 28.

The positive pulses of the output of the engine magneto are used to SET the "teeter-totter" circuit in such a manner as to prevent a false cycle and are applied through diode 32 to charge the SET capacitor 33 connected between the emitter electrode of switching transistor 22 and ground. Zener diode 34, connected to ground from the base electrode of transistor 22, and biasing resistor 35 connected across the base emitter junction of transistor 22 establish the operating reference points to prevent false operation by allowing 25, 26 to be reversed biased before 24 and 25 are turned on.

On engine start-up, a negligible amount of power is taken from the positive low tension pulses of the engine magneto to charge SET capacitor 33 directly through resistors 27, 28 and diode 32. The charging current to capacitor 33 is applied until the voltage across the capacitor exceeds the break-down voltage of Zener diode 34. At this point, transistor 22 conducts and timing capacitor 36 in the base circuit of timing transistor 24 is charged through transistor 22 via conductor 37. Continued positive pulses maintain the charge of SET capacitor 33 slightly above the Zener voltage and the charge of the timing capacitor 36 slightly below the Zener voltage, the difference being approximately equal to the voltage drop across the collector-emitter junction of transistor 22.

When capacitors 33 and 36 reach their steady state condition, timing transistors 23 and 24 are held in conduction by a current flow through resistor 38 and their base-emitter junctions. Resistor 38 is connected from the ungrounded end of capacitor 36 to the base electrode of transistor 24. The collector electrode of transistor 24 is connected, together with the collector electrode of transistor 23, to the [negative] *positive* side of battery 20. The emitter electrode of transistor 24 is connected to the base electrode of transistor 23, and the emitter electrode of transistor 23 is connected to ground. Biasing resistor 39 sets the reference operating point for the timing transistors.

Also, when capacitors 33 and 36 have both reached their steady state condition, SET transistors 25 and 26 are maintained non-conducting by a reverse voltage developed across the voltage divider network comprising resistors 40, 41 and diode 42. *Advantageously, relay R does not react to short pulses due to its relatively long actuation time.* The anode of diode 42 is connected to the ungrounded side of SET capacitor 33 while the cathode of diode 42 is connected to one end of resistor 41, the other end of resistor 41 being connected to one end of resistor 40 which has its other end returned to the [positive] *negative* side of battery 20.

The junction of resistors 40 and 41 is connected to the base electrode of transistor 26 which, together with transistor 25, forms a beta multiplier configuration. The junction of resistors 40 and 41 is also connected to ground through diode 43 which limits the reverse voltage applied to the base of transistor 26. The base-emitter junctions of transistors 25 and 26 are serially connected to ground, while their collector electrodes are tied together and connected to the [positive] *negative* side of battery 20 through the energizing coil 44 of actuating relay R. A protective diode 45 may be provided across the coil to protect against excessive voltage kick back.

As hereinbefore described, the normally open contacts 21 of the actuating relay R are arranged in series with the operating coil 15 of the solenoid valve so that upon removal of the hold-off voltage applied to the base of the transistor 26, the timing transistors are free to conduct, whereupon coil 44 is energized, contacts 21 closed and coil 15 connected across battery 20 for actuation of valve V. Actuation of valve V closes the oil lubricating line causing a drop in oil pressure and actuation of Oil Sentinel A which, in turn, causes the fuel valve in the fuel line to be closed and shut off the fuel supply to the engine.

In operation, either terminals 13 or 14 may be shorted to the ground or the input signal from the engine magneto removed. Any of these conditions serve to remove the sustaining charge from SET capacitor 33 and cause the circuit to cycle. When the sustaining charge is removed, SET capacitor 33 which advantageously has much less capacity than timing capacitor 36, is rapidly discharged through resistor 41, diode 42 and diode 43. The discharge drives the base junction of transistor 26 to zero potential. Diode 42 prevents any further discharge of capacitor 33 and also prevents capacitor 33 from "robbing" current from the base of transistor 26. The voltage at the base of transistor 26 is now free to exceed the voltage drop of the base-emitter junctions of the SET transistors 25 and 26 whereupon these transistors are driven into saturation from the current drive applied by battery 20 through resistor 40, causing coil 44 of the actuating relay to be energized and contacts 21 to close.

In the meantime, timing transistors 23 and 24 are being maintained or held ON by the discharge of capacitor 36 through resistor 38 and the base-emitter junctions of transistors 23 and 24. The cycle continues until the discharge current from timing capacitor 36 can no longer maintain the timing transistors in the ON condition. The ON time is dependent on the time constant fixed by capacitor 36 and resistor 38 which is made relatively long as compared to the time constant of capacitor 33 and resistor 41. When timing transistors 23 and 24 are turned OFF, the crycle state is complete and the actuator relay coil 44 is deengized. Contacts 21 are returned to their open condition and solenoil valve V opens. The unit then assumes the OFF state.

The electronic actuator or senor unit is automatically set as the engine comes up to speed in 5 to 15 seconds. If the engine magneto is shorted (grounded) by any of the tattle-tale panel safety switches so as to remove the output pulses applied to the sensor unit, the circuit will cycle to actuate the solenoid valve V which automatically closes the Oil Sentinel fuel valve. A fast, positive fuel and engine shut-off is thus provided (3–5 seconds) and, in addition, the tattle-tale panel P, as usual, will indicate the malfunction which caused the shut-down.

Figure 3:
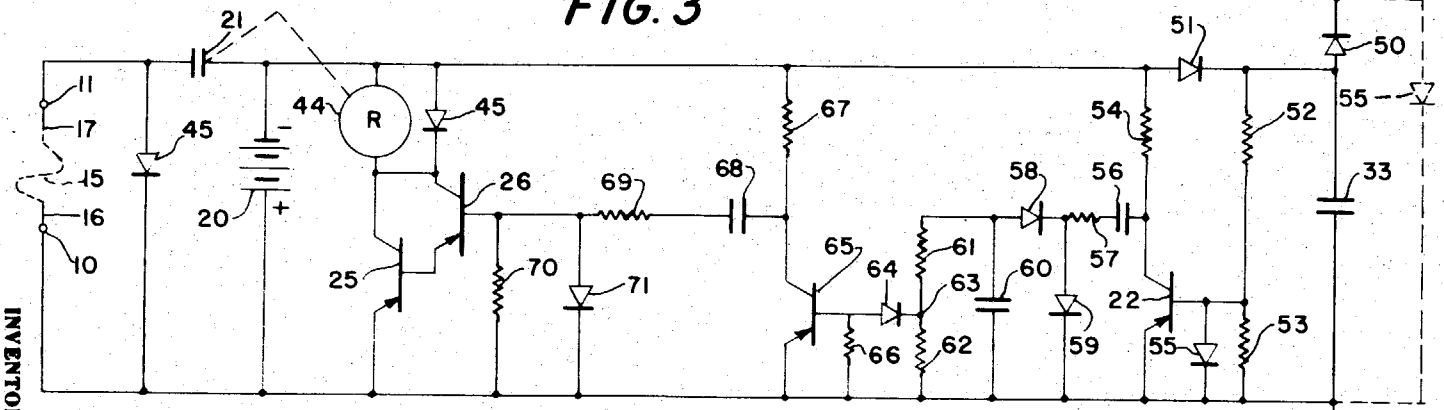
FIG. 3 is a schematic diagram of the electronic actuator of the present invention which is r.p.m. sensitive to the engine magneto output.

Referring now to FIG. 3, there is shown an alternate embodiment of an electronic actuator, similar in [many respects] *reaction* to that shown in FIG. 2, but which is modified slightly to eliminate problems which may occur on engine start-up by [making] *eliminating the simultaneous charging of capacitors 33 and 36 of* the SET circuit of the "teeter-totter" sensor unit [r.p.m. sensitive] *of FIG. 2 and requiring the time capacitor 68 (FIG. 3) to be discharged at a later time by the conduction of transistor 65 which is actuated by the r.p.m. sensitive input circuit* rather than *a* pulse time sensitive *circuit. The time that solenoid 15 is held on during the charge capacitor 68 is independent of the input pulse time relationship thereby allowing* [By this arragement,] the electronic actuator [is] *to be* automatically SET as the engine reaches a fixed r.p.m. such as, for example, 100 r.p.m.

The electronic actuator, for convenience, may be broken down into 4 elements, a trickle charging circuit, an r.p.m. senstive timing circuit, a set circuit and the actuating circuit, and components having similar operating functions to like components of FIG. 2 have been similarly identified.

The trickle charging circuit comprises resistor 27 connected between terminals 13 and 14 and diodes 50 and 51 [and] *which are* serially connected to battery 20. The anode of diode 50 is connected to the ungrounded end of SET capacitor 33 and to the cathode of diode 51 which has its anode connected to the negative side of the battery 20. The input pulses from the engine magneto *that charge the battery* are applied to the cathode of diode 50 through resistor 27 *and through diode 51 to the battery* 20 (*FIG. 3*).

It should be apparent that the charging circuit and the input end of the r.p.m. sensitive circuit have a number of common elements, primarily resistor 27, diodes 50 and 51 and capacitor 33. The diodes 50 and 51 *with resistor 27,* perform a current limiting function as well as a rectifying function required for battery charging. The SET capacitor 33 is charged to the battery voltage less the forward voltage drop of inhibiting diode 51 and any negative pulse from the damped pulse train of the magneto output applied at terminal 13 that is in excess of the voltage across the capacitor will serve to charge the battery.

The voltage across SET capacitor 33 also appears across the parallel connected voltage divider comprising resistors 52 and 53. The junction of resistors 52 and 53 is connected to the base electrode of the sequence or switching transistor 22 which forms the switching element for the r.p.m. circuit. The emitter electrode of transistor 22 is grounded, while the collector electrode is connected to the negative side of battery 20 through resistor 54. Diode 55 is connected between the base electrode and ground protects the base-emitter junction of transistor from being reverse biased. [and] *Diode 55* may alternatively be connected from terminal 14 to ground as indicated by the dashed lines.

Upon charging of capacitor 33 the voltage at the junction of the parallel connected voltage divider is applied as a trigger input to the base electrode of transistor 22. Advantageously, the charge rate of capacitor 33, dependent on the charging circuit formed by resistor 27, is large in comparison to its discharge rate dependent on resistor 52. In this manner, transistor 22 is held on for the damped portion of the magneto pulse train input and only one operating pulse is received per damped pulse train input from the magneto to the r.p.m. sensitive circuit.

The remainder of the r.p.m. sensitive circuit consists of capacitor 56, resistor 57, diodes 58 and 59, capacitor 60 and serially connected resistors 61 and 62. Capacitor 56 and resistor 57 are serially connected from the collector electrode of transistor 22 to the common junction of the cathode of diode 58 and anode of diode 59. The cathode of diode 59 is grounded, while the anode of diode 58 is joined to the parallel connected capacitor 60 and resistors 61, 62.

The output of the r.p.m. sensitive circiut is taken from the junction 63 of resistors 61 and 62 and applied through diode 64 to the base electrode of the SET transistor 65. Transistor 65 is arranged in a common emitter circuit configuration and has its base electrode connected to ground through temperature stabilizing resistor 66 and of battery 20 through resistor 67. The emitter electrode is grounded directly.

The output of the SET circuit is taken from the collector electrode of transistor 65 and coupled to the actuator circuit which comprises capacitor 68, resistors 69 and 70, diode 71, transistors 25 and 26 and the actuating relay R which includes the energizing coil 44 and normally open contacts 21.

In operation, when transistor 22 is turned on, a discharge path is established for capacitor 56 through resistor 57, diode 59 and transistor 22. At the end of an output pulse train from the engine magneto, transistor 22 is turned off allowing capacitor 60 to be charged through diode 58, and resistor 57, capacitor 56 and resistor 54. The discharge path of capacitor 60 is through the voltage divider comprising resistors 61 and 62. The discharge rate of capacitor 60 is made much less than the charge rate so that capacitor 60 accumulates a charge and the voltage across capacitor 60 is proportional to the r.p.m. of the engine.

When the engine speed exceeds 100 r.p.m., the voltage developed across resistor 62 due to the discharge of capacitor 60 exceeds the base emitter voltage threshold of transistor 65 and the transistor is turned ON. Switching of transistor 65 to its ON state establishes a discharge path for capacitor 68 which may be traced through resistor 69, diode 71 and transistor 65. Transistor 65 will maintain capacitor 68 discharged as long as the engine r.p.m. is in excess of 100. The circuit is then considered to be in the SET state.

When the engine speed drops below 100 r.p.m., or terminals 13 or 14 are connected to ground through an external switch, the voltage developed at 63 across resistor 62 is no longer sufficient to maintain transistor 65 in conduction and the transistor is switched off. When transistor 65 is off, capacitor 68 is charged through resistor 67 and the base emitter beta multiplier circuit of transistors 25 and 26 which go into saturation causing the operating coil 44 to be energized. Energization of coil 44 causes contacts 21 to close, thus activating the coil 15 of solenoid valve V as hereinbefore described. The unit is then considered to be in the CYCLE state.

As should be apparent, the cycle time is dependent upon the charging rate of capacitor 68, providing the current flowing into the beta multiplier 25 and 26 is sufficient to hold transistors 25 and 26 in saturation. When the charging current has dissipated, transistors 25 and 26 come out of saturation, relay R and solenoid valve V are deenergized and the unit assumes the OFF state.

Referring now to FIG. 4, there is illustrated another embodiment of the electronic actuator which is similar to that shown in FIGS. 2 and 3, but which is modified slightly to separate low speed detection of approximately 100 r.p.m. and high speed detection ranging from 900 to 1500 r.p.m and which also can be used to provide a linear indication of engine r.p.m.

The modified r.p.m. sensor circuit consists of an additional transistor 72 and its associated elements including emitter resistor 73 and a parallel RC network 74 comprising capacitor 75 and serially connected resistors 76, 77 and 78.

The input transistor 22 of the r.p.m. circuit operates as hereinbefore described and the positive pulse from the magneto output applied at terminal 13 charges capacitor 33 to a voltage equal to the battery potential through resistor 27 and diode 50. The voltage across capacitor 33 likewise appears across the voltage divider comprising resistors 52 and 53, and the voltage at the junction or resistors 52 and 53 turns transistor 22 ON. When transistor 22 is turned ON, the charge stored in capacitor 56 (*FIG 4*) is transferred through *a high impedance source comprising the collector of* transistor 72 [through] *and the* emitter resistor 73 into the RC network 74 thereby eliminating an interaction between the charging circuit, capacitor 56 and resistor 73, and the RC network 74. *This makes the voltage across the RC network 74 linear with respect to the number and amplitude of the current pulses and allows the RC network to be referenced to the positive terminal of the battery* (*FIG. 4*).

The magnitude of the voltage across the RC network depends upon the impedance of the RC network and the rate of charge supplied to the RC network by capacitor 56. The RC network voltage therefore is directly proportional to the r.p.m. of the engine. Thus, it should be apparent, that a suitable indicating device 79 such as, for example, a meter may be connected to the collector circuit of transistor 72 to provide a linear indication of engine r.p.m.

As hereinbefore described, the purpose of the voltage developed across the capacitor 33 is to maintain transistor 72 ON for the limit of the input pulse train of the engine magneto output and to provide sufficient time to discharge capacitor 56. A single discharge of capacitor 56 per single pulse train of the magneto is thus effected. When transistor 22 turns off, capacitor 56 is charged. The charging circuit may be traced from the negative side of battery 20 through resistor 54, capacitor 56 and diode 59 which is returned to the positive side of the battery.

The r.p.m. sensitive circuit of FIG. 4 differs from the r.p.m. circuit of FIG. 3 through the addition of transistor 72 and its associated elements. Formerly, the charge transfer from capacitor 56 to the RC network was equal to the difference in potential which existed between capacitors 56 and 60 (FIG. 3). Presently, by the addition of transistor 72, the charge supplied is equal to the capacity of capacitor 56 times the battery potential, less the diode voltage drop of the diode 59. This is so regardless of the potential appearing across capacitor 75. This improvement allows the use of substantially the entire range of the battery potential for a linear indication of engine r.p.m. As hereinbefore mentioned, a meter 79 could be connected from the collector of transistor 72 to the [negative] *positive* side of the battery ([positive] *negative* grounded) to provide a visual indication of engine r.p.m. Of course, other suitable indicators may also be used.

Two outputs are provided from the r.p.m. sensitive circuit. The first output corresponds to the higher r.p.m. of the engine, approximately 900 to 1500 r.p.m., and is taken from the collector electrode of transistor 72 and applied to the emitter electrode of high speed trigger transistor trigger 80. The second output corresponds to the lower r.p.m. of the engine, approximately 100 r.p.m., and is taken from the junction of resistor 76 and 77 and applied to the base electrode of the low speed transistor trigger 81.

The high speed or overspeed trigger circuit comprises transistor 80 and resistor 77 and 78 of the RC network 74. The low speed trigger circuit comprises transistor 81 and resistor 76 and capacitor 75 of the RC network 74. A tap 82 is provided on battery 20 and connected to the base of transistor 80 to provide a reference voltage therefor. Likewise tap 83 on battery 20 is connected to the emitter electrode of transistor 81 to provide a reference voltage therefor. The use of the tapped battery provides a curve matching technique which permits separation of low speed detection of approximately 100 r.p.m. from high speed detection ranging from approximately 900 to 1500 r.p.m.

In order to accomplish this two speed curve match, the initial impedance of the RC network is made such that a 10 or 20 r.p.m. difference will have a great effect on the output voltage of the RC network. On the other hand, the high speed RC network is advantageously made approximately 10 times smaller so that the total range does not exceed the supply voltage. Accordingly, resistor 76 will have a value which is very large with respect to the total value of resistors 77 and 78, i.e., greater than 10 times the sum of resistors 77 and 78.

In this manner, the small average currents at the 100 r.p.m. level will allow the voltage across the RC network 74 to be equal to the voltage of the battery cell 84 plus the base-emitter drop of low speed transistor 81. When 100 r.p.m. is exceeded, transistor 81 conducts heavily and resistor 76 is effectively shorted by the base-emitter of the transistor and a discharge path is established for capacitor 85 through diode 86 the battery *cell* 84 and the collector-emitter junction of transistor 81. The low speed trigger transistor is thus SET to trigger transistors 25 and 26 upon either the loss of input pulses or the reduction of input pulses below the 100 r.p.m. level.

Diode 86 provides a low impedance for the discharge of capacitor 85 and is connected from one end of the capacitor to the [negative] *positive* side of battery 20 *or, alternatively to the emitter of transistor 81.* The other end of capacitor 85 is connected to the junction of the collector electrode of transistor 81 with the resistor 87 connected to ground. Resistor 87 provides a current limiting element for the charge of capacitor 85 or the trigger current to the base electrode of transistor 26. Diode 88 connected between the junction of capacitor 85 and diode 86 and the common terminal point of the base electrode of transistor 26 and collector electrode of transistor 80 provides a gate so that driving current supplied by transistor 80 is not shunted by a reverse charging of capacitor 85 which would delay triggering of transistors 25, 26. However, diode 88 could be eliminated so long as capacitor 85 is not an electrolytic capacitor. Also, diode 86 could be eliminated at the expense of a longer SET time allowing capacitor 85 to be discharged through the temperature stabilizing resistor 89 connected from the supply bus to the base electrode of transistor 26. Also, a faster reaction time can be realized by connecting the anode of diode 51 directly to terminal 14. Thus, it should be apparent that the various configurations of certain elements of the circuit can be changed to vary recovery time or reaction time without departing from the inventive concept.

As hereinbefore described, resistor 76 is effectively shorted by the base-emitter junction of low speed trigger transistor 81 as long as the input pulses from the engine magneto applied to terminal 13 correspond to an excess of 100 r.p.m. of the engine. With resistor 76 effectively shorted, the impedance of the RC network is substantially equal to the sum of the resistance of resistors 77 and 78. Since the sum is predeterminedly set to be at about 1/10 or less of the resistance of resistor 76, relative increases in voltage across the RC network 74 will be proportioned to hundreds of r.p.m. rather than tens of r.p.m. The absolute ratio is dependent on the setting of resistor 78 which is a potentiometer whose resistance in the circuit is varied by adjustment of arm 90 which, in the preferred embodiment, is chosen to allow a speed range detection from 900 to 1500 r.p.m. The voltage across the RC network increases linearly with an increasing r.p.m. of the engine up to approximately full battery voltage. Where the RC network voltage exceeds the reverse bias applied to the transistor 81 from tap 83 and battery cell 84 plus the base-emitter drop of transistor 81 then the excess output current of the r.p.m. circuit is directed from the collector electrode of transistor 81 to the high impedance base electrode of transistor 26 which is the first element of the time delay circuit formed by the beta multiplier comprising transistors 25 and 26.

The circuit configuration is similar to that of [FIGS. 2 and] *FIG.* 3 and its operation is for all practical purposes the same. In FIG. 3, RC elements 68 and 69 are utilized to trigger the beta multiplier for a fixed period such as, for example, one minute. In FIG. 4, capacitor 85, which corresponds to capacitor 68, is made a smaller value *and thereby of lower leakage than capacitor 68,* FIG. *3,* and a holding circuit comprising resistor 91 and capacitor 92 of *a much larger value* is provided. Resistor 91, is connected from the base of electrode of transistor 26 in series with capacitor 92 which has its free end connected to the terminal 11 and one side of normally open contact 21 so that capacitor 92 is not charged until coil 44 is energized.

In operation, assuming there is a signal length sufficient to cause energization of the coil 44, the input current supplied to the base electrode of transistor 26 by the action of transistor 81 and capacitor 85, or by the action of transistor 80, causes transistors 25 and 26 to saturate, energizing coil 44 of relay R. This causes contacts 21 to close allowing capacitor 92 to charge through resistor 91 and provides an additional driving current to the base electrode of transistor 26. The charging current in itself is sufficient to hold transistor 25 ON for the fixed period which may be approximately one minute. The delay circuit is therefore driven ON and is held ON until the capacitor 92 is charged. As capacitor 92 approaches full charge, the holding current is reduced and transistor 25 turns OFF, deenergizing coil 44 and opening contacts 21. Capacitor 92 then discharges through coil 15 of the solenoid valve and series connected diode element 93 and resistor 94. If desired, diode 45 and resistor [94] *93* may be eliminated so that diode [93] *94* provides kick-back protection allowing the inductive kick to be discharged through capacitor 92 and diode [93] *94*.

The battery trickle charge circuit is similar to that of FIGS. 2 and 3 and consists of resistor 27 and diodes 50 and 51 *with diode 50 preventing the battery from operating transistor 22*. When the voltage pulses of the magneto exceeds the battery voltage, as charging current is supplied to the battery, the current is limited to a trickle charge by the value of resistor 27. Diode 55 provides a low impedance path for negative cycles of the magneto's output voltage pulses *which appear across capacitor 33 during normal operation* so that the average DC current flowing in the magneto is extremely small.

Thus, there has been shown and described several variations of an actuator circuit adapted to be incorporated in an engine protective system to effect engine shutdown by cutting off the fuel supply to the engine. The actuator also provides a convenient circuit for speed detection and for linearly indicating r.p.m. independent of its function in a protective system. It will be readily apparent to those skilled in the art that various modifications may be made without departing from the inventive concept. It is therefore intended by the appended claims to cover all such modifications which fall within the full scope of the invention.

What is claimed is:

1. Apparatus for controlling the flow of fuel to an internal combustion engine in response to a malfunction of the engine or an accessory device driven by the engine comprising a first valve in the fuel supply line of the engine having pressure actuating means normally subject to a pressure equal to that of the lubricant in the lubricating system for maintaining said valve in its open position as long as the pressure exerted on said pressure actuated means is at least equal to a predetermined value and operable to close said valve when the pressure exerted on said pressure actuated means drops below said predetermined value, a solenoid actuated valve in the lubricating supply line of the engine operable for maintaining said lubricating supply line open when the engine or the engine driven accessory is functioning properly and to close the lubricating supply line upon a malfunction of the engine or engine driven accessory to cause the pressure exerted on said pressure actuated means to be reduced below said predetermined value and means for actuating said solenoid actuating valve upon the occurrence of a malfunction.

2. Apparatus for controlling the flow of fuel to an internal combustion engine as set forth in claim 1 further including means responsive to the temperature of the coolant in the cooling system for reducing the pressure exerted on said pressure actuated means below said predetermined value when said temperature rises above a predetermined temperature, even though the pressure of the said lubricant in the lubricating system remains at least equal to said predetermined value.

3. Apparatus for controlling the flow of fuel to an internal combustion engine as set forth in claim 2 wherein said pressure actuated means and said temperature responsive means are subject, respectively, to the pressure of the lubricant in the lubricating system and the temperature of the coolant in the cooling system of the enigne to which the flow of fuel is controlled by said valve.

4. Apparatus for controlling the flow of fuel to an internal combustion engine as set forth in claim 2 wherein said pressure actuating means and said temperature responsive means are subject, respectively, to the pressure of the lubricant in the lubricating system and the temperature of the coolant in the cooling system of an accessory driven by the engine to which the flow of fuel is controlled by said valve.

5. Apparatus for controlling the flow of fuel to an internal combustion engine as set forth in claim 2 wherein said pressure actuated means is subject to the pressure of the lubricant in the lubricating system of the engine to which the flow of fuel is controlled by said valve, and the temperature response means is subject to the temperature of the coolant in the cooling system of an accessory driven by said engine.

6. Apparatus for controlling the flow of fuel to an internal combustion engine as set forth in claim 3 including a second temperature responsive means which is subject to the temperature in the cooling system of an accessory driven by said engine, each of said temperature responsive means being operative individually to reduce the pressure exerted on said pressure actuated means.

7. Apparatus for controlling the flow of fuel to an internal combustion engine as set forth in claim 1 wherein said solenoid actuated valve includes an energizing coil and said means for actuating said solenoid actuated valve comprises a battery adapted to be electrically connected across said energizing coil for energization thereof in response to a malfunction in the engine or the engine driven accessory.

8. Apparatus for controlling the flow of fuel to an internal combustion engine as set forth in claim 7 including a relay having an energizing coil and at least a first pair of normally open contacts, said first pair of normally open contacts being serially connected between the energizing coil of said solenoid actuated valve and said energizing coil of the relay and adapted to be closed upon energization of the energizing coil of the relay in response to a malfunction in the engine or engine driven accessory so as to connect the energizing coil of the solenoid actuated valve across said battery.

9. Apparatus for controlling the flow of fuel to an internal combustion engine as set forth in claim 8 including actuating means for said relay adapted to cause the coil of said relay to be energized in response to the output of a magneto driven by said engine.

10. Apparatus for controlling the flow of fuel to an internal combustion engine as set forth in claim 9 wherein said actuating means is pulse sensitive.

11. Apparatus for controlling the flow of fuel to an internal combustion engine as set forth in claim 9 wherein said actuating means is r.p.m. sensitive.

12. Apparatus for controlling the flow of fuel to an internal combustion engine as set forth in claim 9 wherein said actuating means includes a trickle charge battery circuit means for maintaining said battery charged from the output of the engine driven magneto.

13. Apparatus for controlling the flow of fuel to an internal combustion engine as set forth in claim 9 wherein said actuating means is responsive to grounding of the magneto.

14. Apparatus for actuating a load device comprising a battery operated control circuit, said control circuit having an OFF state and a SET state, input means for applying to said control circuit an input signal comprising a damped pulse train for switching said control circuit from said OFF state to said SET state and maintaining said control circuit in said SET state upon the continued presence of said input signal, means for cycling said control circuit while in said SET state in response to a predetermined change in said input signal to cause said control circuit to be switched from its SET state to its OFF state, a relay having an energizing coil and a pair of normally open contacts, said energizing coil being connected to said control circuit and adapted to be energized therefrom upon cycling thereof to cause said contacts to close, a normally deenergized load device remotely located from said control circuit and adapted to be electrically connected to the battery of said control circuit for energization of said load device and means serially connecting said pair of contacts between said load device and said battery such that said load device is energized upon cycling of said control circuit, and wherein said load device is a solenoid actuated valve having an energizing coil and a valve, and further including an engine, fuel control means for said engine said energizing coil being serially connected with said normally open contacts, said valve being operatively connected to said control means to control operation of said engine and said engine having means for providing said input signal to said input means.

15. Apparatus for actuating a load device comprising a battery operated control circuit, said control circuit having an OFF state and a SET state, input means for applying to said control circuit an input signal comprising a damped pulse train for switching said control circuit from said OFF state to said SET state and maintaining said control circuit in said SET state upon the continued presence of said input signal, means for cycling said control circuit while in said SET state in response to a predetermined change in said input signal to cause said control circuit to be switched from its SET state to its OFF state, a relay having an energizing coil and a pair of normally open contacts, said energizing coil being connected to said control circuit and adapted to be energized therefrom upon cycling thereof to cause said contacts to close, a normally deenergized load device remotely located from said control circuit and adapted to be electrically connected to the battery of said control circuit for energization of said load device and means serially connected said pair of contacts between said load device and said battery such that said load device is energized upon cycling of said control circuit, and wherein said load device is a solenoid actuated valve having an energizing coil and a normally open valve and further including an engine, said valve being connected in the lubricating supply line of said engine, said energizing coil being serially connected with said normally open contacts and being normally deenergized so as to maintain said lubricating supply line open and adapted to be energized upon closing of said contacts to close said valve and to close said lubricating supply line upon cycling of said control circuit, a magneto driven by said engine and adapted to provide to said input means said input signal corresponding to the proper functioning of said engine and further including pressure responsive means connected in said lubricating supply line and adapted to be actuated upon a predetermined drop in pressure in said supply line upon energization of the solenoid actuated valve energizing coil and means responsive to actuation of said pressure responsive means for controlling the flow of fuel to the engine.

References Cited

The following references, cited by the Examiner, are of record in the patented file of this patent or the original patent.

UNITED STATES PATENTS

| | | | |
|---|---|---|---|
| 2,294,152 | 8/1942 | Yates et al. | 123—198 |
| 3,202,143 | 8/1965 | Goodwin | 123—41.15 |

WENDELL E. BURNS, Primary Examiner

U.S. Cl. X.R.

123—41.15